March 7, 1950     B. S. ELLEFSON     2,499,854
SEALING METHOD
Filed Sept. 8, 1947
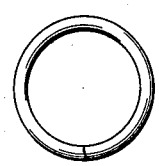
FIG. 2A
FIG. 1
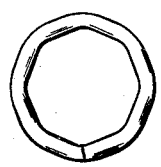
FIG. 2B
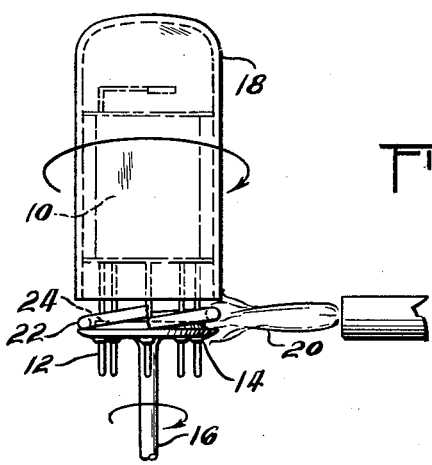
FIG. 3     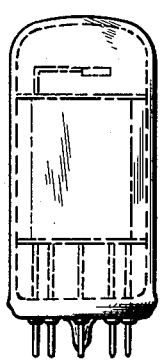 FIG. 4
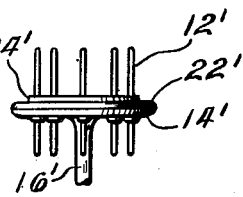
FIG. 5
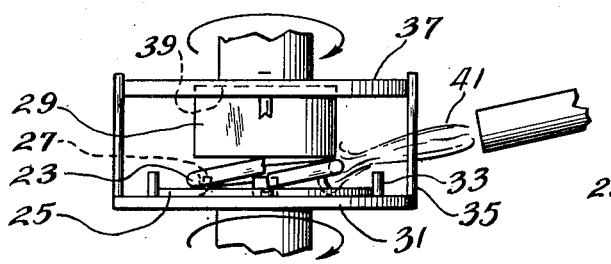
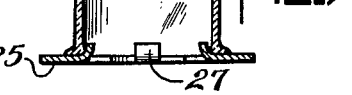
FIG. 7
FIG. 8
FIG. 6
INVENTOR.
Bennett S. Ellefson
BY
His Attorney Patented Mar. 7, 1950

2,499,854

UNITED STATES PATENT OFFICE 2,499,854

SEALING METHOD

Bennett S. Ellefson, Bayside, N. Y., assignor to Sylvania Electric Products Inc., a corporation of Massachusetts Application September 8, 1947, Serial No. 772,693

9 Claims. (Cl. 49—81)

This invention relates to methods of joining two parts, both of glass or one of glass and one of metal. The invention is particularly applicable to the manufacture of electron discharge devices, as in sealing a glass bulb to a header in forming the envelope that encloses the electrodes, and in joining short lengths if glass tubing to metal rings in forming disc-seal tubes.

According to a practice which has been standard in the industry for many years, the edges of relatively hard glass parts to be sealed together are heated moderately and subsequently joined under the action of intense sealing flames. The high temperatures required usually require preheating of the glass part carrying the electrodes, and also of the bulb in some instances. The incidental exposure of the tube elements to the preheating and sealing temperatures tends to cause oxidation and other deleterious effects. To avoid this damage to the tube elements the industry has turned to low-melting glass to form the seal. "Soft" glass of relatively low melting-point, in the form of powdered or granular particles termed frit, has been loosely deposited on a surface to which another glass member is to be secured, the frit then fused, and the resulting glaze is later heat-softened when the seal is to be made. Alternatively, a volatile binder has been mixed with the low-melting frit and pressed in a mold to a desired shape which can be applied with very careful handling to one of the bodies to be joined by a glass seal. With either frit technique there is the serious difficulty that bubbles of air will be included in the seal, thus potentially causing leakage and to some extent weakening the seal. The directly applied frit involves costly waste because of the difficulty in localizing that application, while the use of a volatile binder provides a very fragile and hence unreliable supply of low-melting glass at the point where it is needed.

An alternative form of stock that might occur to those versed in the electron tube art is a short length of glass tubing of low melting-point stock, cut from long tubes. Because of the shortness of the pieces of tubing and their inherently rough edges, such cut tubing would be hopelessly fragile; and the complete circle of glass would have very poor strain characteristics during heating.

The present invention aims at providing an improved sealing procedure. In practicing this invention a soft-glass rod or filament is provided in the form of a complete but not closed loop having the shape of the seal desired and having free ends. Thus a single-turn helix, advantageously made according to the procedure in my copending application Serial No. 426,970 filed January 16, 1942, a division of my Patent No. 2,342,609 filed November 12, 1940, is used in forming a seal between two parts one of which, as for example a piece of hard-glass tubing, requires a circular seal. The soft glass shape is then assembled in proper relation to one of the parts to be joined and heat-softened. After the soft glass is thus bonded to one of the parts or while this is taking place the other of the parts is properly positioned to complete the seal.

The invention will be better understood from the following detailed disclosure and from the drawings illustrating several forms of the invention. The advantages and further features of novelty will be apparent from this detailed disclosure.

Fig. 1 is an elevation of an open-ended single-turn helical glass ring.

Figs. 2A and 2B are plan views of two forms of glass rings having different merits in practicing this invention.

Fig. 3 is an elevation schematically illustrating the start of a glass-to-glass sealing operation and Fig. 4 is an elevation of the sealed product.

Fig. 5 is an elevation of a header having soft glass fused to its periphery in an alternative method.

Figs. 6 and 7 are elevations of the start and finish, respectively, of the invention as applied to the formation of a disc seal and Fig. 8 is a disc terminal to which soft glass has been fused.

Referring to Fig. 3 there is shown a mount 10 comprising the several electrodes of an electron discharge tube, supported on and severally connected to the tops of metal terminals 12 sealed in glass header 14 which customarily comprises an exhaust tube 16. This assembly is to form the vacuum tube in Fig. 4 by enclosing the electrodes in a bulb or shell 18, making a seal between the bulb and the header, evacuating the envelope thus formed through exhaust tube 16, and tipping off that exhaust tube.

In the usual sealing procedure, bulb 18 is assembled over mount 10 and the assembly of the stem and bulb are rotated as a unit about a common axis while preheating and sealing flames are brought to bear on the edges to be joined. In practicing a form of the present invention a glass ring in the form of an open-ended single-turn helix of relatively low-melting glass is assembled between header 14 and shell 18, and fused under the uniform and comparatively brief action of flame 20 that is applied as the assembly rotates. Greater economy of heat is realized and a minimum of deleterious heating of mount 10 is caused before the low-melting glass is fused and the seal is formed.

Low-melting glass ring 22 is centered by providing header 14 with an annular shoulder 24. The fact that the ring is open-ended and with the ends non-opposing by virtue of the helical pitch is of importance in making a header-to-shell seal because the softening flame impinges primarily on the outer periphery of the ring. The unequal expansions which would tend to crack and explode the ring were it a closed circle are relieved by virtue of the open-ended shape. The outer surface of glass, heated first, constricts the ring somewhat to produce a slight overlap of the ends, thereby avoiding excessive heating strains that would be caused were this action prevented as with soft glass pre-forms of other shape. This slight overlap of the ends is further advantageous in reducing the possibility of a radial leak in the seal at the point where the ends of the ring should meet and should be fused. The term "single-turn" is therefore intended to cover rings of substantially 360° extent or of greater circular extent, but not to open-ended rings lacking a portion at the ends such as would cause a radial leak in the seal.

During the heating of the ring the helix gradually sags into a flat circular shape, further tending to close any possible peripheral gap because the length of glass in a 360° helix is greater than that required for a circle of the same diameter. When the soft glass stock has been sufficiently fused, the edges of header 14 and bulb 18 having been concurrently warmed, a seal between header and bulb is formed by moving the parts relatively in an axial direction into close proximity. For further assurance that there will be no radial leak where the ends of the glass helix occur, torsion is advantageously applied between bulb 18 and header 14, the resulting relative rotation causing annular flow of the soft glass stock.

After the seal has been formed between the header and the bulb, the glass envelope thus formed can be evacuated through exhaust tube 16, the usual getter material on mount 10 then flashed and exhaust tube 16 finally tipped off to produce the vacuum tube in Fig. 4.

In carrying out the foregoing procedure it is well to use the circular ring of Fig. 2A which can be properly centered about shoulder 24. However, in the event of slight irregularities occurring on shoulder 24 a ring in the form shown in Fig. 2B having internal recesses can advantageously be used for a closer fit. In this instance, the internal recesses can be arranged to accommodate the occasional protuberances on shoulder 24. Further, the shoulder 24 can be molded to be complementary to the ring of Fig. 2B to insure concurrent rotation of both during heating. Regardless of the form of ring used, whether that of Fig. 2A or Fig. 2B, sufficient allowance should be made between the internal ring diameter and that of the centering shoulder to allow for circumferential constriction of the ring during heating.

It is sometimes advisable to minimize the space between header 14 and bulb 18, so as to reduce the possibility of deleterious heating of the electrodes forming mount 10. In that event ring 22 is advantageously fused to header 14 as a preliminary operation and before assembly of mount 10 to leads 12. When the bulb and header are subsequently sealed together (after securing the mount to leads 12) the fused low-melting point glass would then occupy a much smaller axial distance than in Fig. 3. The admission of hot gases to bulb 18 is thereby reduced to a minimum in the sealing operation. It should be observed however that the heating of the soft glass should not be protracted in such way as to cause it to alloy with the harder glass header. To extend the heating period unnecessarily is to greatly impair the low-melting characteristic of the added glass on header 14. A stem is shown in Fig. 5 with soft glass 22' fused to the periphery of header 14' about shoulder 24' before an electrode assembly is mounted on leads 12'. An electron discharge device is completed using the assembly of Fig. 5 by securing an electrode assembly to lead 12', enclosing the electrodes in a bulb, and sealing the bulb to header 14' (taking advantage of the low-melting characteristics of glaze 22'). Exhaust tube 16' can then be utilized for evacuating the glass envelope, and thereafter it is tipped off.

The sealing procedure utilizing a centered open-ended soft glass ring as in completing the envelope of an electron discharge device (Fig. 3) is also useful in forming the seal between a metal annulus and a short length of glass tubing as in making disc-seal tubes. In Fig. 6 a metal annulus 25 which constitutes the external terminal, the internal connection, and the support of an internal electrode of a disc-seal tube, is provided with centering lugs 27. Glass ring 23 is placed about lugs 27, and a short length of glass tubing 29 is assembled coaxially with the annulus 25. In the event that a ring of the form in Fig. 2B is used, the lugs should lie in a few of its internal recesses. The metal annulus is carried on a platform 31 which is arranged for rotation and which carries a plurality of locating pins 33 distributed about metal ring 25, and a series of pins 35 distributed about the periphery of a locating plate 37 having a recess 39 for orienting tubing 29. Both support 31 and locating plate 37 are then rotated uniformly while flame 41 is brought to bear principally on ring 23 but also on the lower edge of tubing 29 and on metal ring 25. Tubing 29 and ring 25 are brought into close proximity as ring 25 softens and sags; and the tubing and metal ring are advantageously subjected to torsion for further assurance against radial leaks. The open-ended characteristic of low-melting glass ring 23 has the same resistance to heating strains in this sealing method as in the sealing method of Fig. 3. The fact that low-melting point glass is used is of importance in preventing distortion of the glass constituting tubing 29, by avoiding sealing temperatures such as would soften that tubing. The disc-seal formed according to this procedure is shown in its completed state in Fig. 7, and this sealed unit is in condition for assembly to other portions of a disc-seal electron discharge device.

Just as in the case of Fig. 5, it is sometimes desirable to fuse the low-melting glass ring to one of the parts with respect to which it is centered, and later to reheat this fused glass in forming a seal to another part. In Fig. 8 metal ring 25' having locating lugs 27' is shown with a fused ring of soft glass 23' derived from an open-ended soft glass ring, later to be reheated and sealed to a circular part of an electron-discharge device, as a cylindrical wall portion like that in Fig. 6.

The foregoing disclosure explains several forms that illustrate my invention. Certain features are applicable to shapes other than circular, as square or other bond outlines. Considerable latitude of mechanical skill can be exercised in extension, modification and substitution of details in the foregoing disclosure, without departing from the spirit of the invention.

This application is a continuation-in-part of my aforementioned copending application and patent.

What I claim is:

1. The method of bonding two parts together comprising the steps of providing an open-ended low-melting glass loop the projected shape of which corresponds to the outline of the bond to be formed and the ends of which are out of opposition, fusing the loop while in assembly with at least one of the parts, and moving the parts into the desired relative configuration when the low-melting glass is softened, thereafter allowing the assembly to cool.

2. The method according to claim 1 including the further step of rotating one part relative to the other while in contact with the softened low-melting glass to promote flow of the softened glass along the outline of the bond.

3. The method of bonding two circular parts together, one of which is of high melting-point glass, comprising the steps of assembling at least one of the parts in axial alignment with an open-ended helical ring of low-melting glass, applying heat to said ring to fuse it, and sealing said parts together with the fused low-melting glass as the intervening bond.

4. The method of sealing together two circular portions of an electron discharge device, one of which is of relatively high melting-point glass, comprising the steps of assembling at least one of the portions in axial alignment with an open-ended helical ring of relatively low-melting glass, fusing said ring with heat insufficient to damage the associated portion, and sealing said portions together with the fused low-melting glass as an interposed bonding material.

5. The method of sealing together two circular parts of an enclosing vessel, at least one of which parts being of relatively high melting-point glass, comprising the steps of assembling the parts in axial alignment with each other and with an interposed open-ended helical ring of relatively low-melting glass, softening said ring with heat that is inadequate to damage said parts, and moving said parts together relatively to establish a seal, finally allowing the fused soft glass to solidify.

6. The method according to claim 5 wherein one of said parts is rotated relative to the other to cause annular flow of the fused low-melting glass.

7. The method of bonding together two parts to form an enclosing envelope comprising the steps of assembling said parts in opposition with a complete but open-ended loop of glass therebetween, fusing said ring with heat inadequate in temperature and duration to deform or damage said parts, and moving said parts together into the desired configuration to form a seal.

8. In the manufacture of envelopes formed by sealing at least two circular parts together, the parts being of high melting-point material, the method of sealing the parts together comprising the steps of assembling a complete but open-ended helical glass ring in axial alignment with at least one part, fusing the ring to form an annular body of low-melting glass on one part, and bringing the other part into close proximity with the body of glass while softened to form a seal between the parts.

9. In the manufacture of envelopes formed by sealing at least two circular parts together, the parts being of relatively high melting-point material, the method of sealing the parts together comprising the steps of assembling a complete but open-ended helical ring of relatively low-melting glass in axial alignment with at least one part, rotating the ring and the part while in peripheral proximity to a softening flame to form an annular body of low-melting glass on the part, the ends of the helical ring being free for relative peripheral motion during heating, and bringing the other part into close proximity with the body of low-melting glass while softened to form a seal between the parts.

BENNETT S. ELLEFSON.

REFERENCES CITED

The following references are of record in the file of this patent:

UNITED STATES PATENTS

| Number | Name | Date |
| --- | --- | --- |
| 1,861,167 | Vello | May 31, 1932 |
| 2,131,923 | Thomas | Oct. 4, 1938 |